United States Patent Office 3,470,014
Patented Sept. 30, 1969

3,470,014
SUBSTRATES COATED WITH PIGMENTED ACRYLATE COATING AND A FLUOROCARBON TOPCOAT
Francis Frederick Koblitz, Erdenheim, and Robert Gabriel Petrella, Philadelphia, Pa., assignors to Pennsalt Chemical Corporation, Philadelphia, Pa., a corporation of Pennsylvania
No Drawing. Filed Nov. 23, 1966, Ser. No. 596,453
Int. Cl. B44d 1/14, 1/28; C03c 17/00
U.S. Cl. 117—72          10 Claims

ABSTRACT OF THE DISCLOSURE

Substrates coated with a first primer layer of a pigmented acrylic copolymer composed of (a) about 40% to about 80% by weight of a polymerizable acrylic ester of acrylic acid and a primary alkanol containing from 1 to 18 carbon atoms; (b) from about 59% to about 18% by weight of at least one alkyl methacrylate containing from 1 to 4 carbon atoms in the alkyl group; (c) about 0.5% to about 2.0% by weight of at least one polymerizable $\alpha,\beta$-unsaturated carboxylic acid; and as a topcoat a layer of a copolymer consisting of 95% to 60% by weight of vinylidene fluoride and 5% to 40% by weight of tetrafluoroethylene or perfluoropropene.

---

The destructive effects of weathering on surface coatings (such as paints) are well known, and although much progress has been made in the field, it is still extremely difficult, if not impossible, to obtain coatings of desirable properties which will also stand exterior exposure for long periods of time. Desirable exterior coatings should have long-term gloss retention, resistance to marking, non-chalking of pigments, and high strain resistance to prevent cracking and chipping due to structural changes with temperature change. In recent years formulations of fluorocarbon resins, such as polyvinyl fluoride and polyvinylidene fluoride, have been applied to various surfaces to provide improved surface coatings, but even these coatings have disadvantages. For example, they can be scratched, stained, and soiled, and when used on siding panels, the panels must be protected against marring during shipment and construction. Thus, there is a need to find improved coatings of this type.

We have discovered that greatly improved film or coating structures for various substrates such as wood, metal, and the like are obtained by providing on surfaces a composition comprising a primer layer of from about 0.1 to about 4 mils thickness consisting of a pigmented acrylic copolymer of (a) about 40% to about 80% by weight of a polymerizable acrylic ester of acrylic acid and a primary alkanol containing between 1 and 18 carbon atoms; of (b) from about 60% to about 18% by weight of at least one polymerizable alkyl methacrylate containing from 1 to 6 carbon atoms in the alkyl group; and of (c) about 0.5% to about 2.0% by weight of at least one polymerizable $\alpha,\beta$-unsaturated carboxylic acid; and a second clear layer of from about 0.1 to about 2.0 mils of a copolymer consisting of 95% to 60% by weight of vinylidene fluoride and 5% to 40% by weight of tetrafluoroethylene or perfluoropropene. Another embodiment of this invention is the substrate coated with a first layer of a pigmented acrylic copolymer and a second clear layer of the copolymer as defined above. A further embodiment of the invention is the process for making the coated substrates, and this involves applying to a substrate an aqueous dispersion of the acrylic polymer as above defined, drying the coating, applying a solution of the vinylidene fluoride-other fluoroolefin copolymer defined above in an organic solvent system, and thereafter drying the surface at about 70° to about 350° F.

We have discovered that the particular combination of primer and top coat as described above surprisingly gives a wood coating which can adapt to the localized high expansion and contraction which commonly occurs with temperature and moisture content changes in cellulosic building materials, and which frequently causes coatings to crack, chip, blister, or peel from the substrate. These failures of coatings are believed to result from insufficient adhesion and strain resistance, making the coatings non-adaptable to the dimensional changes of the substrate. Furthermore, we have found that the usual pigment chalking and other degradations observed in coatings during exterior exposure do not occur in the coatings of this invention, even after the equivalent of ten years' exposure in accelerated tests. More specifically, we have found that the localized high expansion and contraction which occur at the juncture of the spring and summer grains of wood and which cause grain cracking of coatings, do not cause grain cracking of coated wood products made using the particular system of this invention. No other combination of paint or coatings systems can withstand the expansion and contraction of dimensionally unstable woods such as southern yellow pine and Douglas fir plywood unless applied in excessive thicknesses (about 10 mils).

The coating system of this invention is equally effective on metals, particularly on metals such as aluminum which have relatively high coefficients of expansion. Furthermore, coating systems of this invention provide high strength, abrasion resistance, and protection from the atmosphere, as well as complete prevention of chalking. The coatings systems, because of their high toughness, also are highly formable. Metals coated with these coatings may be cold drawn or bent as much as 200% of their original dimensions without rupture of the coatings.

The aqueous dispersion or latex of the acrylate used as a primer in the invention is selected from the aqueous acrylic copolymer latices of water-insoluble inter-polymers, as described above. Such acrylate inter-polymers are well known and their preparation is described in U.S. 3,234,039 and U.S. 3,037,881. Specific examples of these acrylate polymers are the following:

(A) An aqueous terpolymer latex containing about 40% by weight of butyl acrylate, about 60% by weight of methyl methacrylate and about 1% by weight of acrylic acid.

(B) A latex containing approximately 66% by weight of ethyl acrylate, about 32% by weight of methyl methacrylate, about 1% by weight of acrylic acid, and about 1% by weight of methacrylic acid.

(C) A latex containing ethyl acrylate—260 parts; tert-butyl methacrylate—155 parts; and itaconic acid—4 parts.

(D) A latex as in C, but containing methacrylic acid instead of itaconic acid.

It will be understood that additional copolymer compositions will employ other monomer units as for example:

Acrylic acid esters:
| | |
|---|---|
| methyl acrylate | cyclohexylacrylate |
| isopropyl acrylate | tert-amyl acrylate |
| n-hexyl acrylate | dodecylacrylate |

Alkyl methacrylates:
| | |
|---|---|
| tert-butyl methacrylate | cyclohexyl methacrylate |
| n-hexyl methacrylate | tert-amyl methacrylate |

$\alpha,\beta$-unsaturated carboxylic acids:
| | |
|---|---|
| crotonic acid | citraconic acid |
| maleic acid | aconitic acid |
| fumaric acid | |

Many such copolymer compositions are available commercially and such commercial products are exemplified by the Rhoplex Resins AC–34, AC–22, AC–61 and the like.

The above formulations will be pigmented and will employ any of the usual pigments. For white coatings $TiO_2$ will be preferred because of its excellent hiding power. However, whiting, talc, magnesium silicate, water ground mica, and the like may also be employed in place of or in combination with $TiO_2$. Where a colored primer coating is desired, the usual colored pigments will be used, such as the phthalocyanines, chrome oxide, iron pigments and the like.

The fluorocarbon copolymer, as indicated above, will be a copolymer of vinylidene fluoride with tetrafluoroethylene or perfluoropropene containing from about 95 to about 60% by weight of vinylidene fluoride and from about 5 to about 40% by weight of tetrafluoroethylene or perfluoropropene. Such copolymers are also well known and reference may be made to British Patent No. 589,577 for their preparation. The copolymer will be applied as a clear topcoat from an organic solvent solution of the copolymer, and such formulations will be readily and easily prepared by the skilled art worker in accord with known procedures. For example, the clear topcoat solution of the fluorocarbon copolymer will normally contain from about 10 to 30% by weight of the copolymer in a mixture of organic solvents such as a mixture of dimethylacetamide, cyclohexanone, 2-nitropropane, methyl ethyl ketone, and methyl isobutyl ketone.

The process by which the coating compositions are applied to substrates will involve a first coating with the acrylate composition, preferably by curtain coater or roller coater to obtain a thickness of from about 0.1 to about 4 mils, preferably about 1 to 2 mils. Water and solvents are removed either by air drying or by applying heat, but preferably this first coating is finally baked in an infrared oven at a surface temperature of about 200° F. Then, the clear fluorocarbon copolymer solution is applied. This second coating is first held at room temperature or gently heated to flash off solvent and is thereafter preferably baked under infrared radiation at a surface temperature of 150° to about 350° F.

To illustrate the invention further, the following examples are given:

Example 1

A pigmented acrylic copolymer latex primer was prepared having the following composition:

| | Parts by weight |
|---|---|
| 10% aqueous emulsion of sodium salt of a high molecular weight polycarboxylic acid | 21 |
| Polyoxyethylene ether of octyl benzene | 7.5 |
| Silicone anti-foaming agent | 12 |
| 2% aqueous solution of carboxymethyl cellulose | 200 |
| A rutile titanium dioxide | 647 |
| Calcium carbonate | 560 |
| Carbon black | 0.25 |
| Ethylene glycol | 60 |
| 2-butoxyethanol | 25 |
| Tributyl phosphate | 25 |
| Pine oil | 9 |
| Phenylmercuric acetate | 6 |
| Ammonium hydroxide (28%) | 6 |
| Water | 171 |
| Latex aqueous dispersions (46% solids): | |
| (a) 66% ethylacrylate, 32.7% methyl methacrylate, 1.3% methacrylic acid | 1264.5 |
| (b) 40% butyl acrylate, 59% methyl methacrylate, 1% acrylic acid | 421.5 |

This primer composition was cast on glass using a doctor blade with a five mil gap. The cast composition was subjected to a five minute flash-off period followed by baking at 300° F. for 15 minutes.

A clear topcoat solution of a fluorocarbon resin was formulated as follows:

| | Percent by weight |
|---|---|
| Polymer | 20 |
| Dimethylacetamide | 40 |
| Cyclohexanone | 12 |
| 2-nitropropane | 10 |
| Methylethylketone | 18 |

Four topcoating solutions of the above formulation were prepared with the following fluorocarbon polymers:

(a) a copolymer of 95% by weight of vinylidene fluoride and 5% by weight of tetrafluoroethylene, (b) a copolymer of 85% by weight of vinylidene fluoride and 15% by weight of tetrafluoroethylene, (c) a copolymer of 68% by weight of vinylidene fluoride and 32% by weight of tetrafluoroethylene, and (d) 100% polyvinylidene fluoride.

The above topcoating solutions were cast on glass using a doctor blade with a 0.020 inch (20 mils) gap and were also cast on top of the acrylate primer films previously prepared. In each case the films were baked in an infrared oven for fifteen minutes at a surface temperature of 300° F. The films were air cooled to room temperature and allowed to stand for four days prior to measurement of physical properties.

The following table illustrates the measured physical properties on the above films:

| | Tensile strength, p.s.i. | Percent elongation |
|---|---|---|
| 1 mil $VF_2$ homopolymer | 8,200 | 10 |
| 1.2 mil 95% $VF_2$, 5% TFE | 5,300 | 90 |
| 1 mil 85% $VF_2$, 15% TFE | 4,440 | 100 |
| 1.2 mil 68% $VF_2$, 32% TFE | 3,100 | 250 |
| 1 mil primer | 700 | 150 |
| 1.0 mil primer plus 1 mil 95% $VF_2$, 5% TFE | | 200 |
| 1.0 mil primer plus 1.4 mil 85% $VF_2$, 15% TFE | 3,000 | 350 |
| 1.0 mil primer plus 2 mil 68% $VF^2$, 32% TFE | 2,200 | 600 |

It will be observed from the analysis of the above table that the coating composition of the invention has unexpectedly high elongation, and, in fact, there is a synergistic effect. This is evident from the fact that the expected percent elongation of the composite should be no greater than the lower value of the two layers used. As can be seen, however, when the acrylic polymer is coated with the fluorocarbon in accord with the invention, the elongation in every case is significantly higher than expected, thus suggesting that the two coatings are functioning together synergistically.

Further, microscopic examination of the cross-section of the coatings shows no definite boundary between the pigmented first coat and the non-pigmented second coat. This plus the impossibility of separating the layers by physical means suggests that the second coat penetrates and combines with the first coat during the coating process. The result is a monolithic coating structure with a gradation in composition from all acrylic polymer at the bottom through an acrylic-fluoropolymer region to an all fluoropolymer composition at the top. Accelerated aging tests of the above coatings of the invention on Douglas fir plywood panels indicated excellent resistance to weather for 20 years.

Example 2

When the above procedure is carried out except that the copolymer composition of the topcoat is a vinylidene fluoride-perfluoropropene product, the excellent physical properties of tensile strength and elongation are obtained and the synergistic effect is also clearly evident. Accelerated weathering tests are also indicative of 20-year service.

In similar service life tests with systems involving as a primer coat a pigmented vinyl urethane on Douglas fir plywood and with clear topcoats of (a) 70% vinylidene fluoride—30% tetrafluoroethylene copolymer and (b) 95% vinylidene fluoride—5% tetrafluoroethylene, it was observed that in each case intercoat adhesion was quite poor. Thus it is evident that the monolithic coating structure of this invention is dependent upon both the primer coat and topcoat defined by the invention.

It will be understood that many variations and changes may be made from the above description and examples without departing from the spirit and scope of the invention. For example, the clear topcoat composition may be modified with other resins without adverse and often with desirable effects. For example, alkyd and acrylic resins may be mixed with the topcoat in an amount of to about 20% by weight to obtain compositions entirely within the utility and scope of the invention.

We claim:
1. A coated substrate comprising a primer coat layer of from about 0.1 to about 4 mils thickness consisting of a pigmented acrylic copolymer wherein the acrylic copolymer consists of (a) about 40% to about 80% by weight of a polymerizable acrylic ester of acrylic acid and a primary alkanol containing between 1 and 18 carbon atoms; of (b) from about 59% to about 18% by weight of at least one alkyl methacrylate containing from 1 to 4 carbon atoms in the alkyl group, and of (c) about 0.5% to about 2.0% by weight of at least one polymerizable $\alpha,\beta$-unsaturated carboxylic acid; and as a top coating layer a clear layer of from about 0.1 to about 2 mils of copolymer consisting of 95% to 60% by weight of vinylidene fluoride and 5% to 40% by weight of tetrafluoroethylene or perfluoropropene.

2. A coated substrate as in claim 1 where the primer coat is comprised of a copolymer of butyl acrylate, methyl methacrylate and acrylic acid.

3. A coated substrate as in claim 1 where the primer coat is comprised of a copolymer of ethyl acrylate, methyl methacrylate and acrylic acid.

4. A coated substrate as in claim 1 wherein the primer coat is comprised of a copolymer of ethyl acrylate, t-butyl methacrylate, and itaconic acid.

5. A coated substrate as in claim 1 where the primer coat is comprised of butyl acrylate, methyl methacrylate and methacrylic acid.

6. A coated substrate as in claim 1 wherein the primer coat is comprised of a copolymer of ethyl acrylate, methyl methacrylate and methacrylic acid.

7. A coated substrate as in claim 1 wherein the clear layer is a copolymer of about 95% vinylidene fluoride and about 5% tetrafluoroethylene.

8. A coated substrate as in claim 1 wherein the clear layer is a copolymer of about 70% vinylidene fluoride and about 30% tetrafluoroethylene.

9. A coated substrate as in claim 1 wherein the clear layer is a copolymer of about 60% vinylidene fluoride and about 40% tetrafluoroethylene.

10. A coated substrate as in claim 7 wherein the substrate is wood.

References Cited

UNITED STATES PATENTS

| 3,037,881 | 6/1962 | McDowell | 117—72 |
| 3,108,086 | 10/1963 | Russell et al. | |
| 3,128,200 | 4/1964 | Park et al. | 117—72 |
| 3,234,039 | 2/1966 | Lalk et al. | 117—148 X |
| 3,306,766 | 2/1967 | Hathaway et al. | 117—75 X |

FOREIGN PATENTS 589,577  6/1947  Great Britain.

WILLIAM D. MARTIN, Primary Examiner

R. HUSACK, Assistant Examiner

U.S. Cl. X.R.

117—75. 124. 148